US011121967B2

(12) United States Patent
Li (10) Patent No.: US 11,121,967 B2
(45) Date of Patent: Sep. 14, 2021

(54) DATA ROUTING ACROSS MULTIPLE AUTONOMOUS NETWORK SYSTEMS (71) Applicant: Algoblu Holdings Limited, Grand Cayman (KY)

(72) Inventor: Ming Li, Beijing (CN)

(73) Assignee: Algoblu Holdings Limited, Grand Cayman (KY)

( * ) Notice: Subject to any disclaimer, the term of this patent is extended or adjusted under 35 U.S.C. 154(b) by 171 days.

(21) Appl. No.: 14/639,624

(22) Filed: Mar. 5, 2015

(65) Prior Publication Data
US 2016/0261493 A1 Sep. 8, 2016

(30) Foreign Application Priority Data
Mar. 5, 2015 (CN) .......................... 201510096385.0

(51) Int. Cl.
*H04L 12/717* (2013.01)
*H04L 12/755* (2013.01)
*H04L 12/26* (2006.01)

(52) U.S. Cl.
CPC .............. *H04L 45/42* (2013.01); *H04L 43/50* (2013.01); *H04L 45/021* (2013.01); *H04L 43/08* (2013.01)

(58) Field of Classification Search
CPC .... H04L 43/0876; H04L 45/021; H04L 45/42
See application file for complete search history.

(56) References Cited

U.S. PATENT DOCUMENTS

| 9,197,569 | B2 | 11/2015 | Li | |
|---|---|---|---|---|
| 9,461,923 | B2 | 10/2016 | Li | |
| 2006/0256724 | A1* | 11/2006 | Martini | H04L 45/04 370/238 |
| 2007/0064598 | A1* | 3/2007 | Nooner | G06Q 20/102 370/229 |
| 2009/0147692 | A1* | 6/2009 | Hasan | H04L 41/5009 370/252 |
| 2010/0077056 | A1* | 3/2010 | Kokal | H04N 21/23106 709/217 |
| 2010/0290344 | A1* | 11/2010 | Meloche | H04L 41/12 370/241 |
| 2011/0026520 | A1 | 2/2011 | Zhou et al. | |
| 2011/0142041 | A1* | 6/2011 | Imai | H04L 45/124 370/389 |

(Continued)

FOREIGN PATENT DOCUMENTS

CN 1585357 2/2005
WO WO 2015040624 A1 3/2015

*Primary Examiner* — Oleg Survillo
*Assistant Examiner* — Christopher P Cadorna (57) ABSTRACT Systems and methods providing a route optimization mechanism for transmitting data traffic across different autonomous systems based on real-time route performance detection. Regarding a request for routing data between a source node that is coupled to a first autonomous system and a destination node located in a second autonomous system, each of a plurality of edge nodes in the first autonomous system operates to detect and evaluate real-time route performance. The evaluation results are compared and used to select an edge node and an associated link for transporting data between the source node and the destination node. The route optimization mechanism can be adopted in an SDN-based or other virtual network autonomous system.

20 Claims, 4 Drawing Sheets (56) References Cited

U.S. PATENT DOCUMENTS

| | | |
|---|---|---|
| 2013/0044636 A1 | 2/2013 | Koponen et al. |
| 2013/0107729 A1 | 5/2013 | Wagner et al. |
| 2013/0250770 A1 | 9/2013 | Zou et al. |
| 2013/0298220 A1* | 11/2013 | Yoon .................. H04L 63/0263 726/12 |
| 2014/0195666 A1* | 7/2014 | Dumitriu ............ H04L 12/4625 709/223 |
| 2014/0283030 A1* | 9/2014 | Moore ................ H04L 63/0236 726/22 |
| 2014/0317256 A1 | 10/2014 | Jiang et al. |
| 2015/0012658 A1* | 1/2015 | Elmore ............... H04L 65/4084 709/226 |
| 2015/0163147 A1 | 6/2015 | Li et al. |
| 2016/0234099 A1* | 8/2016 | Jiao ........................ H04L 45/02 |
| 2016/0323171 A1* | 11/2016 | Stokking ............. H04L 43/0888 |
| 2017/0324622 A1* | 11/2017 | Ubaldi .................... H04L 41/12 |

\* cited by examiner

201 — At an ingress edge node of the first autonomous system, receiving a user request to visit a target IP address in the second autonomous system 202 — Broadcasting a routing detection request to a plurality of egress edge nodes of the first autonomous system 203 — Dynamically detecting routing performance between each of the plurality of egress edge nodes and the target IP address 204 — Sending the detected performance data to a central controller of the first autonomous system 205 — Selecting an egress edge node based on the detected performance data 206 — Routing data between the ingress edge node to the target IP address via the selected egress edge node

DATA ROUTING ACROSS MULTIPLE AUTONOMOUS NETWORK SYSTEMS

CROSS REFERENCE

This application claims priority to and benefit of Chinese Patent Application No. 201510096385.0, filed on Mar. 5, 2015, in the State Intellectual Property Office (SIPO), the entire content of which is incorporated by reference herein for all purposes.

TECHNICAL FIELD

The present disclosure relates generally to the field of network traffic routing, and, more specifically, to the field of routing across multiple autonomous systems.

BACKGROUND

An autonomous system refers to a network or a collection of networks that are administrated by a single entity or organization, e.g., an Internet service provider. Typically, an autonomous system is a heterogeneous network having many different subnetworks with combined routing logic and common routing policies. Each subnetwork is assigned with a globally unique autonomous system number. Usually, the information of one autonomous system that is needed for a conventional routing determination process is not readily available to another autonomous system, such as network topology, condition, and statuses, etc.

Border Gateway Protocol (BGP) is a standardized exterior gateway protocol designed to exchange routing and reachability information between autonomous systems on the Internet. The BGP is used to make routing decisions based on paths, network policies or rule-sets configured by a network administrator, and is involved in making core routing decisions. The BGP may be used for routing within an autonomous system. In this application it is referred to as Interior Border Gateway Protocol (iBGP). In contrast, the Internet application (across multiple autonomous systems) of the protocol may be referred to as Exterior Border Gateway Protocol (eBGP).

In a software-defined network (SDN) architecture, the control plane that implements important network routing and switching functionalities and the data forwarding plane are decoupled. The control plane can be logically centralized and implemented with a variety of hardware components of varied architectures. The data plane may utilize inexpensive and simplified network switches or routers configurable by an SDN controller as a result. The SDN paradigm has increasingly gained popularity in both research and commercial environments due to its scalability, cost-efficiency, reliability, and flexibility in customizing and optimizing network services to specific user needs.

Unfortunately, the BGP has not been developed for SDNs and thus cannot be used as the routing protocol for routing data across autonomous systems that involves an SDN. In general, there lacks an effective mechanism of facilitating data delivery between different autonomous systems where at least one system includes an SDN. As a consequence, quality of service (QoS) requirements of such data transmission cannot be satisfied.

SUMMARY OF THE INVENTION

Therefore, it would be advantageous to provide a routing optimization mechanism for transporting data across different autonomous systems involving an software-defined network (SDN).

Provided herein are systems and methods of route detection for transmitting data across different autonomous systems. For a given source node coupled to a first autonomous system and a destination node in a second autonomous system, the route detection involves selecting an egress edge node of the first autonomous system for routing data between the source and the destination. A plurality of edge nodes of the first autonomous system are configured to collect and evaluate real-time network performance information between the respective edge nodes and the destination node. The performance data and evaluation results are supplied from each edge node to a central controller of the first autonomous system. Accordingly, the central controller selects an edge node according to quality of service (QoS) and/or other constraints for transmitting the outgoing traffic to the destination node. In one embodiment, the first autonomous system includes a software-defined network (SDN) or a virtual network, and the edge nodes correspond to points-of-presence of the network which include route detection logic and performance evaluation logic.

Therefore, even in the scenarios that the topology information of the second autonomous system remains inaccessible to the first autonomous system, an edge node and a data route offering superior transmission performance can be effectively determined. In addition, because the route is selected based on the real-time network performance, the current conditions and statuses of the network elements and links are taken into account, which advantageously further ensures quality of service.

According to one embodiment, a computer implemented method of routing data across different autonomous systems includes identifying a source node coupled to a first autonomous system and a destination node in a second autonomous system for routing the data, where the first autonomous system includes a plurality of edge nodes. Each edge node of the plurality of edge nodes is instructed to detect network performance between the edge node and the destination node. The detected information is evaluated and compared and used to select an edge node from the plurality of edge nodes. A route is determined for routing the data between the selected edge node and the destination node.

The foregoing is a summary and thus contains, by necessity, simplifications, generalization and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Data Routing Across Multiple Autonomous Network Systems

Embodiments of the present disclosure provide a route optimization mechanism for transmitting data traffic across different autonomous systems based on real-time route performance detection. Regarding a request for routing data between a source node that is coupled to a first autonomous system and a destination node located in a second autonomous system, each of a plurality of edge nodes in the first autonomous system operates to detect and evaluate real-time route (or link) performance. The evaluation results are compared and used to select an edge node and an associated link for transporting data between the source node and the destination node.

Figure 1:
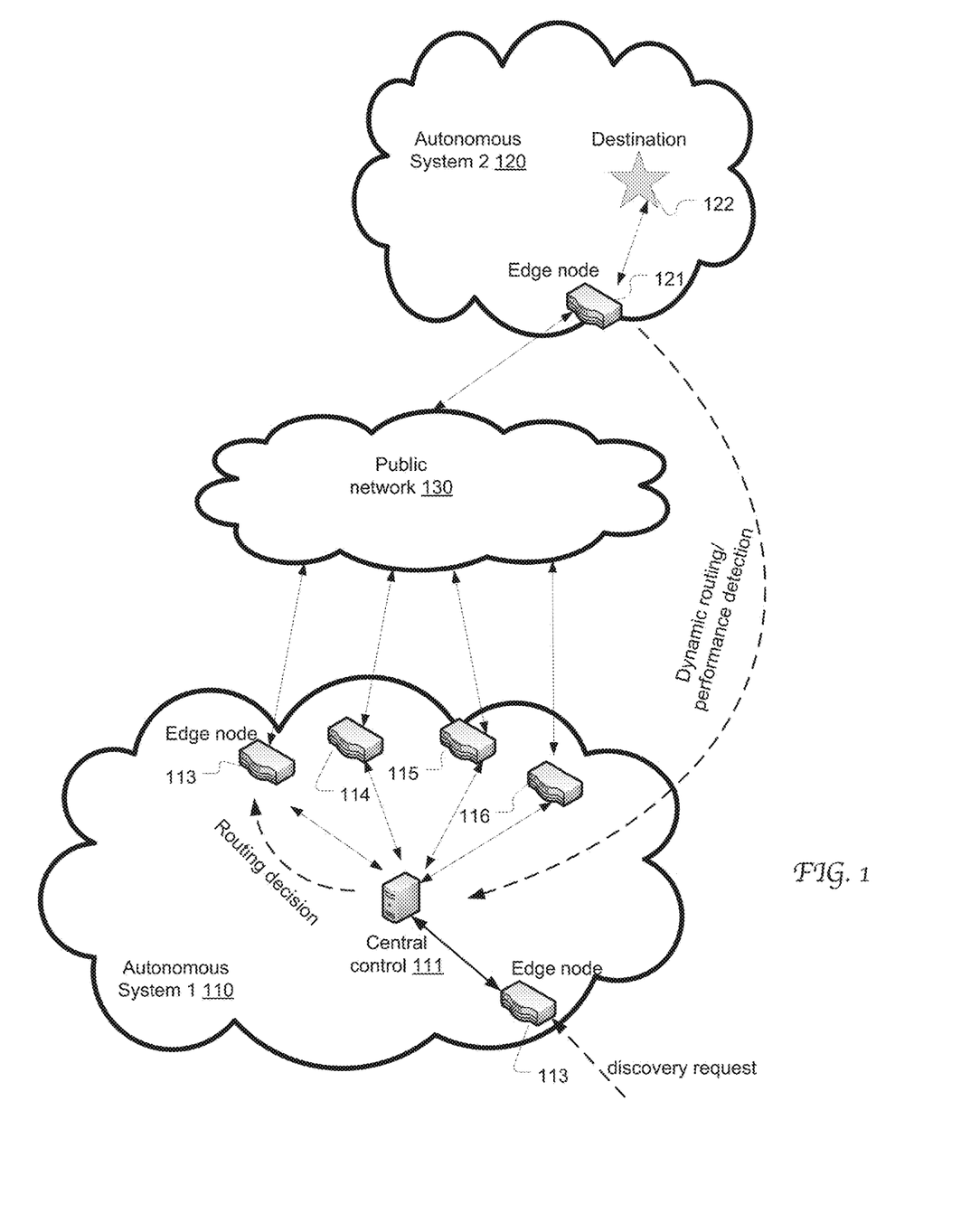
FIG. 1 illustrates an exemplary communication system in which data traffic can be routed across two autonomous systems and in accordance with an embodiment of the present disclosure.

FIG. 1 illustrates an exemplary communication system 100 in which data traffic can be routed across two autonomous systems 110 and 120 in accordance with an embodiment of the present disclosure. Each autonomous system 110 or 120 includes network elements within a defined domain that a particular entity (e.g., an Internet service provider) owns, operates or manages. Both autonomous systems 110 and 120 are coupled with a core network 130 which may be a public access network such as the Internet, a physically separate intranet, or other interconnection. The first autonomous system 110 includes an ingress edge node 112, egress edge nodes 113-116, and a central controller 111. A source node (not explicitly shown) is communicably coupled to the first autonomous system. The destination node 122 is located in the second autonomous system 120 which includes an ingress edge node 121.

For instance, a route discovery request is received at the ingress edge node 112 for data transmission between the source node and a destination node 122 by way of the first autonomous system 110. According to the present disclosure, responsive to the request, each of a plurality of egress edge nodes 113-116 is equipped to collect real-time performance data with regards to one or more routes linking the edge node to the destination node 122. Each egress edge node is also equipped to evaluate the route performance (e.g. by computing a set of metrics) based on collected data. The performance data and the evaluation results are communicated to the central controller 111 in the first autonomous system 110 and used to make a routing decision which identifies an optimal egress edge node and an associated route for routing subsequent data traffic between the selected egress node and the destination node 122. Further, a link within the first autonomous system between the ingress edge node and the selected egress edge node is determined according to a route optimization process to accomplish optimized end-to-end data transmission. As a result, a data transmission route is dynamically established between the source node and the destination node by way of the selected egress edge node, the public network 130, and an ingress edge node 121 of the autonomous system 2 120. However, in some embodiments, more than one egress edge node of the first autonomous system 110 can be selected for transmitting data in the fashion of load sharing and balancing.

Therefore, an optimized data transmission route can be selected across multiple autonomous systems regardless of the availability of the network topology information of an involved autonomous system. In addition, the transmission route is selected based on the real-time network performance and advantageously takes into account the current conditions and statuses of the network elements and links. As a consequence, the selected route advantageously provides an enhanced quality of service.

Moreover, a route between the ingress edge node 112 and a selected egress edge node (e.g., the node 113) can be determined in any suitable manner that is well known in the art. In some embodiments, the ingress edge node 112 is capable of collecting real-time performance data and evaluating the collected performance data with regards to one or more routes directing to the sleeted edge node 113. It will be appreciated that the evaluation process performed by an ingress edge node may use the same or different criteria or metrics as used by an egress edge node as described above. Based on the collected data and evaluation results, a routing decision regarding data transmission within the first autonomous system 110 is made, for example by the central controller 111, the ingress edge node 112, or any other suitable network element in the system 110. In this manner, the entire source-to-destination transmission route is advantageously determined based on the real-time network performance.

Figure 2:
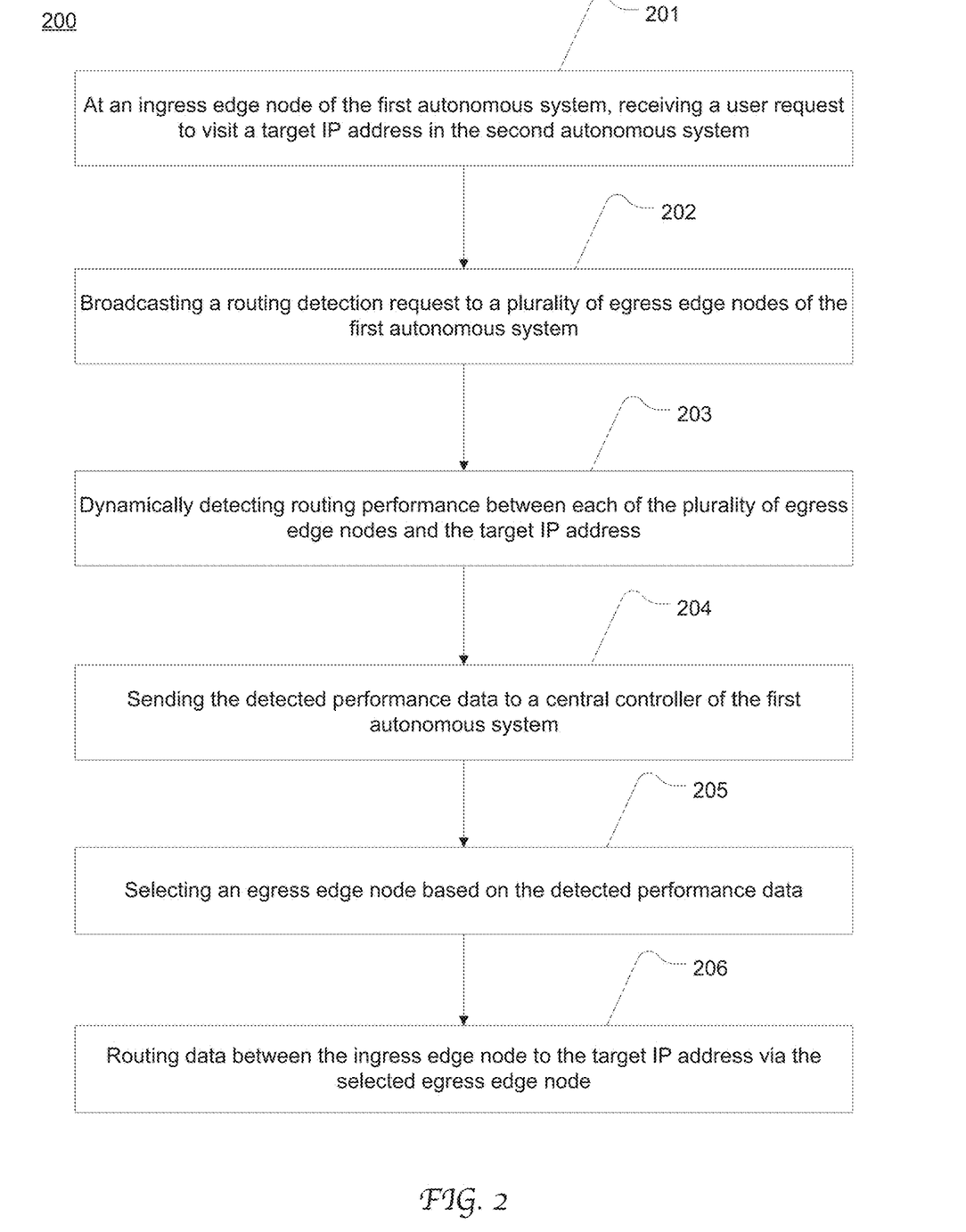
FIG. 2 is a flow chart depicting an exemplary computer implemented method of discovering a data route across multiple autonomous systems according to an embodiment of the present disclosure.

FIG. 2 is a flow chart depicting an exemplary computer implemented method 200 of discovering a data transmission route across multiple autonomous systems according to an embodiment of the present disclosure. In this example, data is to be routed through a first autonomous system to a target IP address (the destination node) in a second autonomous system. At 201, a user request to visit the destination is received at an ingress edge node of the first autonomous system. In response, a route discovery request is generated for discovering a route for transmitting data between the first autonomous system and the destination node.

At 202, a route detection request is broadcast to a plurality of edge nodes that are eligible as egress points for the first autonomous system. At 203, each of the plurality of edge nodes collects the performance data with respect to the candidate links between the edge node and the destination node. At 204, each edge node processes and evaluates the collected performance data according to the evaluation criteria. An evaluation result and optionally the detected performance data are submitted to a central controller of the first autonomous system.

As will be appreciated by those skilled in the art, the present disclosure is not limited to any specific mechanism of attaining route performance data at an edge node of an autonomous system, either egress or ingress. In some embodiments, an egress edge node is configured to generate test packets (e.g., in compliance with the Border Gateway Protocol (BGP)) and send them to the candidate routes directing to the destination node located in another autonomous system. Based on the route behaviors responsive to the test packets, the egress edge node derives performance information regarding the links between the edge node and the destination along the routes. The performance information may be related to quality of service policies regarding availability, throughput, bandwidth utilization, speed, stability, packet loss, round trip time (RTT), reliability, unreachable time, latency, error rates, CPU and/or memory utilization and associated latency, etc.

At 205, the central controller applies policy or other constraints to the submitted evaluation results and thereby selects an edge node and the associated link directing to the destination. Upon the egress point is selected, a path between the ingress edge node and the selected egress point can be further determined, e.g., in according to a routing optimization process. At 207, data traffic is transmitted between the source node and the destination node by way of the selected egress edge node.

It will be appreciated by those skilled in the art that the present disclosure is not limited to any specific type or architecture of the network which includes the mechanism for discovering a route across different autonomous systems. The involved autonomous systems may be deployed on a wireless local area network (WLAN), a local area network (LAN), a wide area network (WAN), and etc. The autonomous systems according to the present disclosure may include a virtual network, a software-defined network (overlaying on physical network or natively as the primary network), a physical network only, or a combination thereof. For an autonomous system deployed on a virtual network, and typically a virtual private network, the edge nodes may correspond to gateway nodes, virtual routers or any other suitable network elements. For an autonomous system deployed on an SDN, the edge nodes may correspond to SDN points-of-presence (POPs) or any other suitable network elements. For an autonomous system exclusively deployed on a physical network, the edge nodes may correspond to proxy servers or any other suitable network element.

Figure 3:
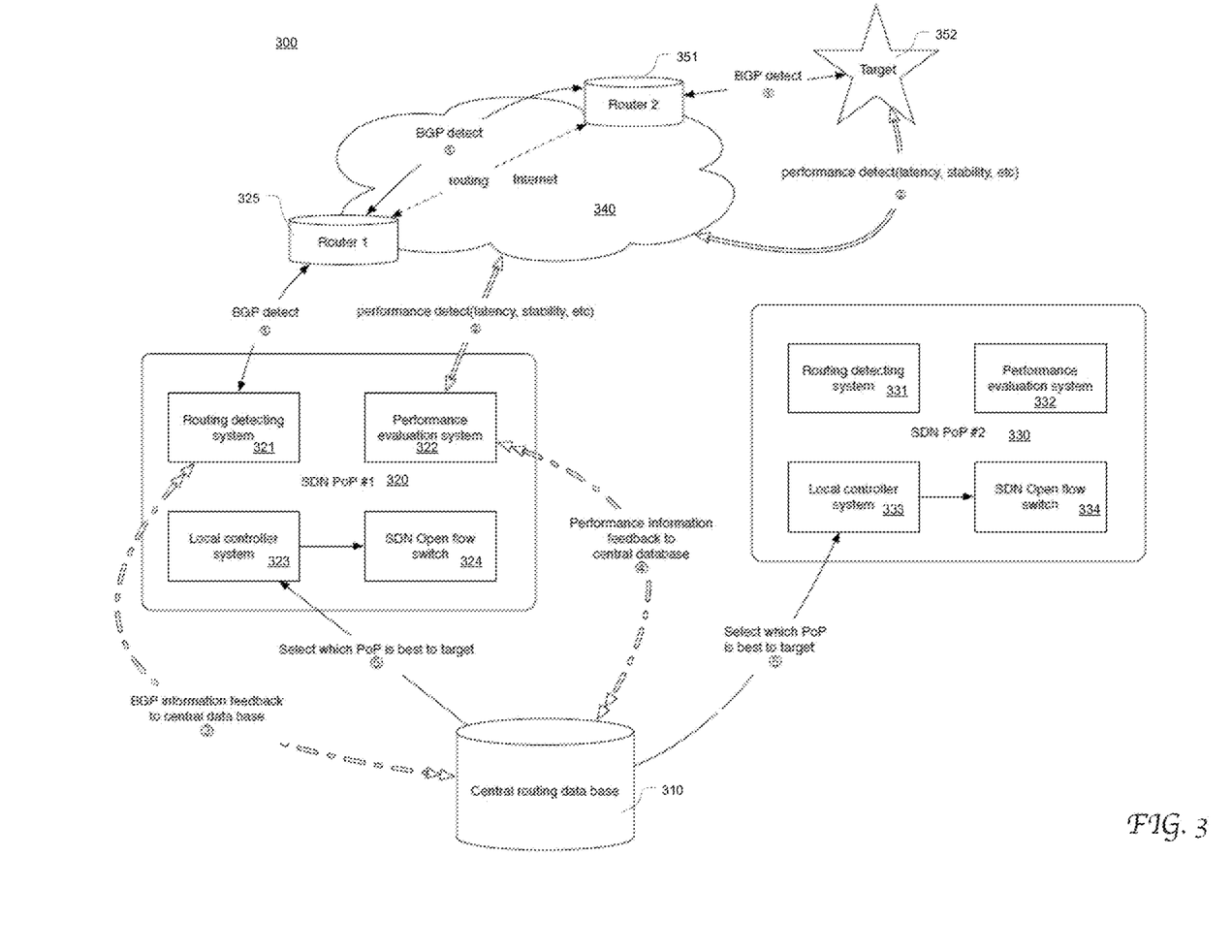
FIG. 3 illustrates the configuration of exemplary SDN-based autonomous system configured to discover an optimized path for routing data to another autonomous system in accordance with an embodiment of the present disclosure.

FIG. 3 illustrates the configuration of an exemplary SDN-based autonomous system configured to discover an optimized path for routing data to another autonomous system in accordance with an embodiment of the present disclosure. The SDN in this example has a hierarchical control system and includes a central controller 310 and local controllers 323 and 333 that are distributed in the POPs 320 and 330. As shown, the POPs 320 and 330 serve as edge nodes of a first autonomous system. The central controller 310 maintains a central routing database. Each of the POPs 320 or 330 is coupled to a respective physical router. For example, the router 1 325 is coupled to the POP 320. The destination node is located in a second autonomous system and is coupled to the router 2 351 coupled to the target IP address (or the destination node) 352. The two autonomous systems are both coupled to the Internet 340.

According to the present disclosure, the SDN POPs 320 and 330 have the similar configuration and each include a routing detecting system, a performance evaluation system, a local controller system, and an SDN Openflow switch. It will be appreciated that these components can be implemented as hardware logic, software programs, or a combination thereof. For example in the POP 320, the routing detection system 321 is configured to detect route information in response to a route discovery request sent from the central controller 310. The route information to be detected may be specific to a network application and service. In some embodiments, a route discovery request is generated each time a data packet is to be transmitted outside the first autonomous system.

In some embodiments, the SDN POP 320 includes BGP logic for collecting path information defined in the BGP (as shown by the arrowed lines 1). For example, the BGP logic is used to detect the hop count of a path between the present POP 320 and the destination node 352.

The SDN POP 320 is configured to generate test packets (e.g., in compliance with the BGP) and send them to the candidate routes directing to the destination node located in another autonomous system. Based on the route behavior responsive to the test packets, the routing detecting system can derive performance information regarding the routes between the POP and the destination node. In some embodiments, the performance information may be related to one or more attributes selected from availability, throughput, bandwidth utilization, speed, stability, packet loss, RTT, reliability, unreachable time, latency, error rates, CPU and memory utilization and associated latency.

In some embodiments, varying test packets can be generated at the POP 320 based on the characteristics and performance of respective routes selected to transmit the test packets. In some embodiments, test packets have different lengths depending on the bandwidths of the routes to be evaluated. Moreover, a packet generator can send out different sizes of packets to test a particular route or link, for example packets of 64 bytes, 128 bytes, and 512 bytes. Accordingly, latency data corresponding to each size of packet can be obtained respectively. Then the bandwidth usage and thus available bandwidth of the link or route can be derived by dividing the packet size by the latency time. As will be appreciated by those skilled in the art, a packet generator can be implemented in any suitable method that is well known in the art.

In some embodiments, microflow performance data related to particular application availability, utilization, and performance as well as performance characteristics of the underlying server can be selectively collected from network equipments, infrastructure, and actual servers. The routing detecting system may also be configured to gather macroflow performance data related to aggregated network traffic based on individual connections, users, protocols or applications.

The performance evaluation system 322 is configured to determine the link performance between the POP 320 and the destination node 352, e.g., by using PING, RTT or other performance detecting method (as shown by arrowed lines 2). The performance evaluation system 322 analyzes the performance data collected by the detection module 321 in accordance with any suitable model or algorithm, and evaluate the routes with reference to the evaluation criteria. Ins some embodiments, the evaluation criteria is are defined in terms of bandwidth, reachability, delay, cost, jitter, link usage, real time logs, throughput, error rate, stability, technology, modulation technique, enhancement measures, Mean Opinion Score (MOS), or any combination thereof.

The BGP information (as shown by arrowed line 3) and the performance information (as shown by arrowed line 4) are communicated to the central controller 310. Based on the received information and according to a set of policy constraints, the central controller 310 can decide which POP is the best for routing data to the target IP 352. For example, if the POP 320 is determined to be the superior than the POP 310, the central controller 310 signals the local controller 323 in the POP 320 indicating that the POP 320 is selected as an egress point for routing data to the destination node 352 (as shown by arrowed lines 5). In response, the local controller 323 modifies the flow table with new entries identifying the selected route for the data packet. The flow table is sent to the Openflow switch 324 and used to forward the subsequent data packet. The Openflow switch 324 is a virtual router in the data plane of the SDN for example.

Once the egress point is determined, a link within the first autonomous system between the present ingress edge node and the selected egress point is further determined, e.g., according to a route optimization process. In some embodiments, this internal link can determined by the local controller of the selected edge node, for example based on real-time link performance data. Alternatively, the internal link can be determined by the central controller of the SDN.

Based on the performance evaluation results, the SDN controller 310 can intelligently select an optimized route for data transmission. Alternatively, the SDN controller can select multiple routes that meet the application requirements to transmit data simultaneously to improve network efficiency. In the latter situation, the SDN controller may intelligently allocate the data flow to the multiple routes depending on respective route performance. For example different workload is distributed to different routes in accordance with load balancing.

Figure 4:
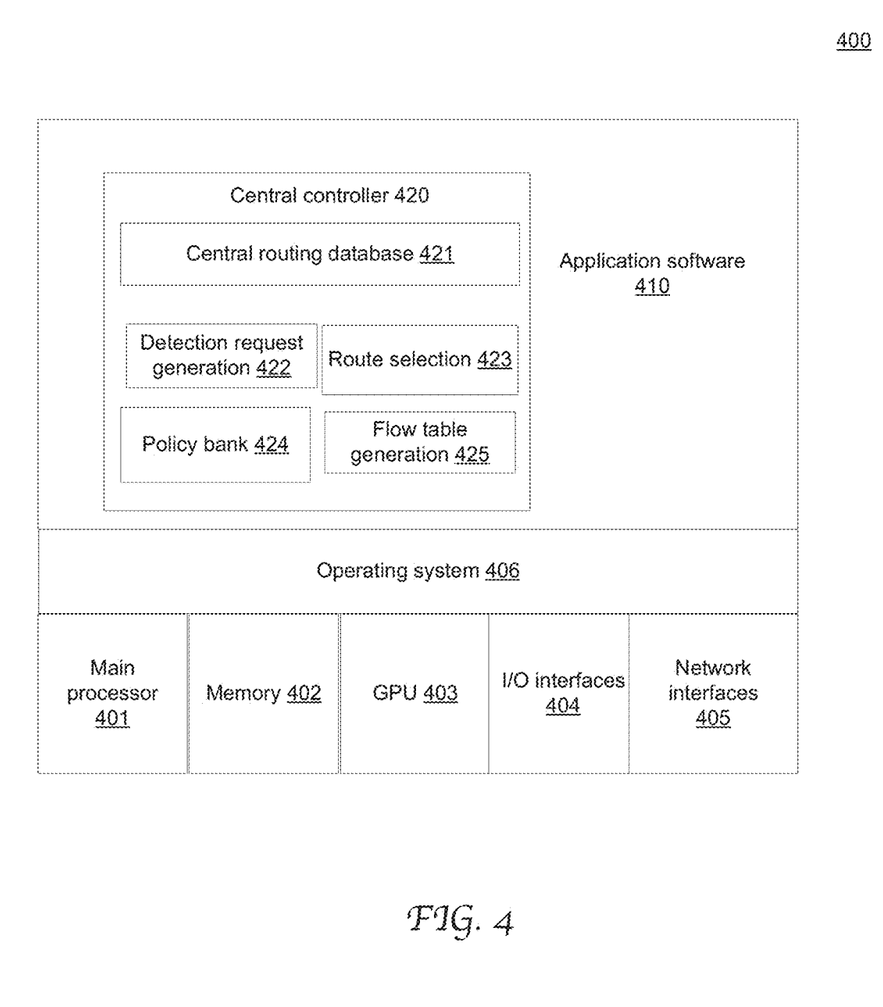
FIG. 4 is a block diagram illustrating the configuration of an exemplary SDN central controller device capable of intelligently determine an optimized route across multiple autonomous systems based on real-time link performance data according to an embodiment of the present disclosure.

FIG. 4 is a block diagram illustrating the configuration of an exemplary SDN central controller device 400 capable of intelligently determine an optimized route across multiple autonomous systems based on real-time link performance data according to an embodiment of the present disclosure. The device 400 may be a general-purpose server computer. The central controller 400 includes a main processor 401, system memory 402, a graphics processing unit (GPU) 403, I/O interfaces 404 and network circuits 405, an operating system 406 and application software 410. The application software 410 includes central control program 420 stored in the memory 402. When executed by the main processor 401, the central control program 420 can communicate with SND edge nodes (POPs) and coordinate with the lower-level controllers disposed therein to control the data flow from a first autonomous system to a second autonomous system.

More specifically, the central control program 420 program includes the central routing database 421 of the first autonomous system, a detection request generation 422 module, a route detection module 423, a policy bank 424, and a flow table generation module 425. The central routing database 421 maintains the information regarding the arrangement and statuses of various components and the physical and logical structure of the first autonomous system as well as the dynamic link performance information provided from the SDN edge nodes. The detection request generation module 422 generates a route detection request, e.g., each time a data packet is to be routed outside the first autonomous system. Based on the information contained in the database 421 and the applicable policy constraints stored in the policy bank 424, the route selection module 423 applies the set of policy constraints on the detected performance data according to a route optimization process to make a routing decision. For example, the route selection module 423 can compare the evaluation results that are provided from the candidate edge nodes to make the selection. The decision identifies a selected egress edge node and the selected link directing to the destination node in another autonomous system. The decision may also identify a link within the first autonomous system between an ingress node and the select egress edge node. Accordingly, the flow table generation module 425 generates a flow table and sends it to the local controller associated with the selected egress edge node. The central controller program 420 may perform other various functions and processes as discussed in detail with reference to FIG. 1-3.

It will be appreciated that the central controller program 400 may include a wide range of other modules and functions that are well known in the art. Techniques for implementing these programmed modules are well known in the art. As will be appreciated by those with ordinary skill in the art, the central controller program 420 can be implemented in any one or more suitable programming languages that are known to those skilled in the art, such as C, C++, Java, Python, Perl, C #, SQL, etc.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A computer implemented method of routing data across different autonomous systems, said method comprising:
responsive to a data routing request, identifying, by a central controller, a dynamic data transmission route between a source node coupled to a first autonomous system and a destination node in a second autonomous system for routing said data;
instructing, by said central controller, each of a plurality of candidate egress edge nodes of said first autonomous system to detect real-time route performance data with regard to one or more associated routes linking each of said plurality of candidate egress edge nodes of said first autonomous system to said destination node in said second autonomous system with respect to said data routing request, wherein said detection of said real-time route performance data comprises:
obtaining, by each of said plurality of candidate egress edge nodes, in response to sending a plurality of test packets of different lengths, latency time corresponding to each of said plurality of test packets of different lengths sent from each of said plurality of candidate egress nodes to said destination node; and
obtaining, at each of said plurality of candidate egress edge nodes, available bandwidth of each of said one or more associated routes linking each of said plurality of candidate egress edge nodes of said first autonomous system to said destination node in said second autonomous system based on the length of each of said plurality of test packets and obtained latency time;
collecting, by said central controller, of said first autonomous system said detected real-time route performance data of said associated one or more routes linking each of said plurality of candidate egress edge nodes to said destination node; and
determining, by said central controller, a selected one of said plurality of candidate egress edge nodes and associated route linking said selected egress edge node to said destination node for routing subsequent data transmission between said selected egress edge node to said destination node across said first and second autonomous systems based on said detected real-time route performance data.

2. The computer implemented method of claim 1, wherein said first autonomous system comprises a software-defined network (SDN) and said second autonomous system comprises a virtual network.

3. The computer implemented method of claim 2, wherein said plurality of candidate egress edge nodes comprise SDN point-of-presence (POP).

4. The computer implemented method of claim 3, wherein each of said plurality of candidate egress edge nodes is configured to:
send a test signal to said destination node responsive to said instructing each of said plurality of candidate egress edge nodes to detect said real-time route performance data; and
detect a hop count with respect to said test signal along each of the one or more associated routes linking each candidate egress edge node to said destination node.

5. The computer implemented method of claim 1, wherein said detected real-time route performance data is further related to one or more attributes of reachability, speed, load, packet loss, stability, unreachable time, round trip time, reliability, link usage, throughput, cost, jitter and/or Mean Opinion Score (MOS).

6. The computer implemented method of claim 1, wherein said first autonomous system comprises a physical network, and wherein said plurality of candidate egress edge nodes comprise candidate edge proxy servers of said physical network.

7. The computer implemented method of claim 1, wherein said plurality of candidate egress edge nodes comprise candidate virtual routers of said first autonomous system.

8. The computer implemented method of claim 1 further comprising:
determining a route for routing said data between an ingress edge node of said first autonomous system coupled to said source node and said selected egress edge node in accordance with a route optimization process.

9. The method of claim 1, where said plurality of test packets of different lengths correspond to test packets of 64 bytes, 128 bytes, or 512 bytes.

10. An apparatus implemented as an egress edge node of a first autonomous system, said apparatus comprising:
a network interface communicably coupled to said first autonomous system, wherein said first autonomous system comprises a plurality of candidate egress edge nodes and a central controller;
detection logic configured to, based on a request sent from said central controller, detect real-time network performance data on each of one or more links between each of said plurality of candidate egress edge nodes in said first autonomous system and a destination node in a second autonomous system, wherein said detection logic is further configured to:
obtain, in response to sending a plurality of test packets of different lengths, latency time corresponding to each of said plurality of test packets of different lengths sent from each of said plurality of candidate egress nodes to said destination node, and
obtain available bandwidth of each of said one or more links between each of said plurality of candidate egress edge nodes in said first autonomous system and said destination node in said second autonomous system based on length of each of said plurality of test packets and obtained latency time;
evaluation logic configured to evaluate and compare said detected real-time network performance data of each of said one or more links between each of said plurality of candidate egress edge nodes and said destination node with reference to evaluation criteria;
local control logic configured to send said detected real-time network performance data and an evaluation result to said central controller; and
network switching configured to, based on an instruction from said central controller indicating a selected one of the plurality of candidate egress edge nodes and a corresponding link between said selected egress edge node and said destination node based on said detected real-time network performance data and said evaluation result, forward data from a source node on said corresponding link between said selected egress edge node and said destination node, wherein said source node is coupled to said first autonomous system.

11. The apparatus of claim 10, wherein said first autonomous system is associated with an internet service provider (ISP) and comprises a software-defined network (SDN), and wherein said plurality of candidate egress edge nodes corresponds to point-of-presence (POP) of said SDN.

12. The apparatus of claim 11, wherein said local control logic is further configured to maintain an updated flow table based on said instructions sent from said central controller, and wherein further said central control logic is configured to determine a route between an ingress edge node of said first autonomous system and said selected egress edge node, wherein said source node is communicably coupled to said ingress edge node.

13. The apparatus of claim 11, wherein said second autonomous system is associated with a different ISP and comprises another SDN, a virtual network, or a physical network.

14. The apparatus of claim 10, wherein said first autonomous system comprises a physical network, and wherein further said plurality of candidate egress edge nodes corresponds to edge proxy servers of said first autonomous system.

15. The apparatus of claim 10, wherein said detection logic comprises Border Gateway Protocol (BGP) logic.

16. The apparatus of claim 10, wherein said real-time network performance data is further related to reachability, speed, load, packet loss, stability, unreachable time, round-trip time, reliability, link usage, throughput, cost, jitter and/or Mean Opinion Score (MOS).

17. A system comprising;
network circuits;
a processor coupled to said network circuits; and
memory coupled to said processor and comprising instructions that, when executed by said processor, implement a central controller and cause said central controller to perform a method of facilitating data routing across multiple autonomous systems, said method comprising:
   responsive to a data routing request, identifying a source node coupled to a first autonomous system and a destination node in a second autonomous system for routing said data, wherein said first autonomous system comprises a plurality of candidate egress edge nodes;
said central controller instructing each of said plurality of candidate egress edge nodes to detect real-time network performance data with regard to each of one or more link routes between said plurality of candidate egress edge nodes in said first autonomous system and said destination node in said second autonomous system with regard to said data routing request, wherein said detection of said real-time route performance data comprises:
   obtaining, by each of said plurality of candidate egress edge nodes, in response to sending a plurality of test packets of different lengths, latency time corresponding to each of said plurality of test packets of different lengths sent from each of said plurality of candidate egress nodes to said destination node; and
   obtaining, at each of said plurality of candidate egress edge nodes, available bandwidth of each of said one or more associated routes between said plurality of candidate egress edge nodes in said first autonomous system and said destination node in said second autonomous system based on the length of each of said plurality of test packets and obtained latency time;
said central controller collecting said detected network performance data by said plurality of candidate egress edge nodes;
said central controller evaluating and comparing said detected real-time network performance data;
said central controller selecting an egress edge node from said plurality of candidate egress edge nodes and corresponding link route between said selected candidate egress edge node and said destination node based on said central controller evaluating and comparing said detected real-time network performance data; and
said central controller determining a corresponding link route between said selected candidate egress edge node and said destination node for routing said data from said first autonomous system and across said second autonomous system to said destination node.

18. The system of claim 17 wherein said first autonomous system comprises a software-defined network (SDN) and said second autonomous system comprises a virtual network.

19. The system of claim 18, wherein a respective edge node of said plurality of candidate egress edge nodes comprises an SDN point-of-presence (POP), and wherein further said respective edge node is configured to send a test signal to said destination node responsive to said instructing.

20. The system of claim 17, wherein said method further comprises:
determining a route transporting said data between an ingress edge node of said first autonomous system and said selected egress edge node, wherein said source node is communicably coupled to said ingress edge node.

* * * * *